US012567262B2

(12) United States Patent
Rude et al.

(10) Patent No.: US 12,567,262 B2
(45) Date of Patent: Mar. 3, 2026

(54) METHOD AND SYSTEM FOR AUTOMATICALLY CAPTURING AND EXTRACTING DATA FROM IMAGES OF AGRICULTURAL FIELD CROPS AND WEEDS USING MACHINE LEARNING PROCESSES

(71) Applicant: Croptimistic Technology Inc., Naicam (CA)

(72) Inventors: Derek Stanley Rude, Muenster (CA); Stuart Hassall, Peachland (CA); Corwyn Willness, Naicam (CA); Abdul Bais, Regina (CA); Muhammed Hamza Asad, Regina (CA)

(73) Assignee: Croptimistic Technology Inc., Naicam (CA)

( * ) Notice: Subject to any disclaimer, the term of this patent is extended or adjusted under 35 U.S.C. 154(b) by 0 days.

(21) Appl. No.: 18/563,687

(22) PCT Filed: May 24, 2022

(86) PCT No.: PCT/CA2022/050822
§ 371 (c)(1),
(2) Date: Nov. 22, 2023

(87) PCT Pub. No.: WO2022/246548
PCT Pub. Date: Dec. 1, 2022

(65) Prior Publication Data
US 2024/0257529 A1 Aug. 1, 2024

Related U.S. Application Data

(60) Provisional application No. 63/192,521, filed on May 24, 2021.

(51) Int. Cl.
G06V 20/56 (2022.01)
A01B 76/00 (2006.01)
(Continued)

(52) U.S. Cl.
CPC ............. *G06V 20/56* (2022.01); *A01B 76/00* (2013.01); *G06V 10/77* (2022.01); *G06V 20/188* (2022.01); *H04N 7/183* (2013.01)

(58) Field of Classification Search
None
See application file for complete search history.

(56) References Cited

U.S. PATENT DOCUMENTS

| | | | | |
|---|---|---|---|---|
| 9,652,840 | B1 * | 5/2017 | Shriver | G01N 33/24 |
| 10,255,670 | B1 * | 4/2019 | Wu | H04N 7/183 |

(Continued)

FOREIGN PATENT DOCUMENTS

| | | | | |
|---|---|---|---|---|
| CA | 2770216 C | 10/2016 | | |
| CA | 3120370 A1 * | 6/2020 | | A01B 79/005 |
| CA | 3121647 A1 * | 7/2020 | | A01C 21/00 |

OTHER PUBLICATIONS

ISA/CA; International Search Report and Written Opinion for International Patent Application No. PCT/CA2022/050822, mailed Sep. 2, 2022, 8 pages.

*Primary Examiner* — Ricky Chin
(74) *Attorney, Agent, or Firm* — NK Patent Law

(57) ABSTRACT

A method and system for automatically capturing and extracting data from images of agricultural field crops, weeds, and soil within management zones representing soil, water, and topography (SWAT) features of a field wherein the camera system is mounted onto and powered by any vehicle that may pass over agricultural fields. Images and data extracted from the images are automatically uploaded to a processing server for viewing and analysis by farmers and agricultural service providers. The images are analyzed by machine learning processes to document critical weed and crop data by SWAT management zone and entire fields.

15 Claims, 7 Drawing Sheets

(51) Int. Cl.
    *G06V 10/77*    (2022.01)
    *G06V 20/10*    (2022.01)
    *H04N 7/18*    (2006.01)

(56) References Cited

U.S. PATENT DOCUMENTS

| | | | | |
|---|---|---|---|---|
| 10,531,603 | B2 * | 1/2020 | Ferrari | A01B 69/001 |
| 11,234,366 | B2 * | 2/2022 | Darr | A01D 41/1278 |
| 11,238,283 | B2 * | 2/2022 | Young | A01B 79/005 |
| 11,280,608 | B1 * | 3/2022 | Zermas | G01S 19/45 |
| 11,386,651 | B2 * | 7/2022 | Yamamoto | G06Q 10/063 |
| 11,560,680 | B2 * | 1/2023 | Baßfeld | G05B 15/02 |
| 11,641,800 | B2 * | 5/2023 | Blank | A01D 41/127 |
| | | | | 460/22 |
| 11,758,847 | B2 * | 9/2023 | Vandike | A01D 41/127 |
| | | | | 56/10.2 F |
| 11,825,761 | B2 * | 11/2023 | Maeder | G05D 1/0212 |
| 11,874,669 | B2 * | 1/2024 | Vandike | B60K 35/80 |
| 12,008,744 | B2 * | 6/2024 | Peshlov | G06N 3/045 |
| 12,025,602 | B2 * | 7/2024 | Shore | G06V 20/20 |
| 12,127,500 | B2 * | 10/2024 | Palla | G05D 1/0278 |
| 12,225,846 | B2 * | 2/2025 | Vandike | A01B 79/005 |
| 12,229,886 | B2 * | 2/2025 | Anderson | G06T 17/05 |
| 12,232,438 | B2 * | 2/2025 | Khait | C12N 15/8213 |
| 12,236,373 | B2 * | 2/2025 | Zur | G01N 33/0098 |
| 12,243,324 | B2 * | 3/2025 | Khonsarian | G06V 20/58 |
| 2013/0231968 | A1 * | 9/2013 | Willness | A01B 79/005 |
| | | | | 705/7.12 |
| 2016/0239709 | A1 * | 8/2016 | Shriver | G06V 20/188 |
| 2018/0035605 | A1 * | 2/2018 | Guan | G06V 10/7715 |
| 2019/0050948 | A1 * | 2/2019 | Perry | G06Q 30/02 |
| 2021/0019522 | A1 * | 1/2021 | Xian | G06V 10/776 |
| 2021/0103728 | A1 * | 4/2021 | Young | G06V 20/56 |
| 2022/0155054 | A1 * | 5/2022 | Humpston | G06T 7/62 |
| 2022/0156603 | A1 * | 5/2022 | Marvaniya | G06N 5/04 |
| 2024/0257529 | A1 * | 8/2024 | Rude | G06V 20/60 |

* cited by examiner

HIGH CROP LEAF AREA

LOW CROP LEAF AREA 2.9    44.4    85.9
Crop Leaf Area-(percent)

HIGH WEED LEAF AREA

LOW WEED LEAF AREA 0.5    25.8    51
Weed Leaf Area-(percent)

CROP MATERIAL

WEED MATERIAL

CROP MATERIAL

WEED MATERIAL

METHOD AND SYSTEM FOR AUTOMATICALLY CAPTURING AND EXTRACTING DATA FROM IMAGES OF AGRICULTURAL FIELD CROPS AND WEEDS USING MACHINE LEARNING PROCESSES

RELATED APPLICATION

This application is a U.S. National Stage Application of International Patent Application No. PCT/CA2022/050822, filed on May 24, 2022, which claims priority to U.S. Provisional Application No. 63/192,521, filed on May 24, 2021, herein explicitly incorporated by reference in its entirety.

FIELD

The present invention relates to methods and systems for capturing images of field crops representing some or all management zones based on soil, water, and topography (SWAT) features of a field for the purposes of observation, comparison, documentation, and analysis. In particular methods and system for capturing images for analysis by machine learning processes from an image capture system mountable to a variety of vehicles.

BACKGROUND

Variable rate application of seed, fertilizer, herbicides, and other chemicals is growing in popularity due to the potential for more optimal placement of these products in an over-arching effort to increase profitability and reduce environmental impact across a field and farm. An initial step in a variable rate program is establishing management zones. For example, Canadian Patent No. 2770216 to Willness describes a method of basing management zones on a blend of soil, water, and topography (SWAT) data layers. The rates applied of each product in each management zone are based on soil sample results and yield goals within each SWAT management zone.

In order to evaluate the strategies implemented for each management zone in season crop data in the form of images can be captured for further analysis. This data provides a feedback mechanism that guides strategy in subsequent years. Current methods for capturing these images can be costly and or sometimes of too low of data sampling resolution to have confidence in the data across a whole farm.

Many methods and systems have been employed for capturing in season images of crop via cameras on satellites. These methods are economical for capturing images of crop. However, the resolution of these images is usually insufficient to extract meaningful information at an individual plant and/or a weed level. Also, cloud cover can obscure the view of fields for extended periods during important crop and weed growth stages.

A drone as the camera platform are able to quickly capture images at plant level resolution across a field. Currently, drone operation requires a trained person to plan and monitor a flight over the fields which add significant cost to the process. Also, the area able to be flown in a day at plant level resolution is limited by battery power and the drone operator has to install batteries throughout the day if flying over a large area.

Stationary camera systems are often installed in conjunction with weather stations within agricultural fields. These cameras are able to capture plant level images throughout the growing season however these stationary camera systems only capture images of a single location in a large field thus lacking the spatial resolution to enable crop and weed analysis by zone. Installing multiple stationary cameras per field would be costly and installation and removal of multiple stationary camera systems would be labor intensive.

SUMMARY

The invention may comprise any and/or all aspects as described herein.

According to an aspect, there is provided an image capture system configured to be mounted to a farm vehicle. The image capture system may have one or more cameras, a global positioning sensor (GPS), a data storage, a communication channel, and a processor executing instructions from a tangible computer-readable medium. The instructions may comprise: receiving at least one image capture location via the communication channel; receiving at least one GPS coordinate from the GPS; determining when the at least one GPS coordinate is within a predetermined radius of the at least one image capture location; instructing the at least one camera to capture at least one image of field crops; receiving the at least one image corresponding to the at least one image capture location; and storing the at least one image on the data storage. The instructions may further comprise: one or more machine learning processes processing the one or more images of field crops. The instructions may further comprise: providing the one or more images of field crops to a cloud server via the communication channel. The cloud server may comprises one or more machine learning processes processing the at least one image of field crops.

The machine learning processes may extract at least one of: crop data weed data, percentage of bare soil, soil organic matter data, soil texture data, plant spacing data, plant counts per area data, and vegetation coverage data from the at least one image of field crops. The one or more machine learning processes may aggregate the at least one image by at least one of: a management zone, a field, a crop type, a soil type, and a farm. The crop data and weed data may comprise at least one of: a percent crop leaf area, a percentage weed leaf area, a crop height, a plant population, a crop leaf color, a crop leaf discoloration, a crop damage, a crop temperature, and a soil temperature. The machine learning processes may generate a record of a crop growth trend and a weed growth trend for the management zone. The one or more machine learning processes may generate a coefficient of variation; and/or may assign a variability rating. The crop growth trend and the weed growth trend may determine at least one variable rate prescription.

The one or more cameras may be selected from at least one of: an RGB camera, a near infrared camera, and an infrared camera. The one or more cameras may be located on the farm vehicle between 3-ft to 6-ft above a ground surface.

The image capture system may further comprise a cab processor receiving an interface for displaying the at least one image.

According to another aspect, there is provided an agronomist computer having a communication channel, a processor executing instructions from a tangible computer-readable medium, The instructions may comprise: generating one or more management zones; assigning one or more image locations for each of the one or more management zones; populating one or more GPS locations associated with the one or more image locations; providing the one or more GPS locations via the communication channel to the image capture system. The instructions may further comprise: providing an interface to adjust the one or more image locations for each of the at least one management zone. The one or more image locations may be evenly spaced throughout each of the one or more management zones.

DESCRIPTION OF THE DRAWINGS

While the invention is claimed in the concluding portions hereof, example embodiments are provided in the accompanying detailed description which may be best understood in conjunction with the accompanying diagrams where like parts in each of the several diagrams are labeled with like numbers, and where:

DETAILED DESCRIPTION

Figure 1:
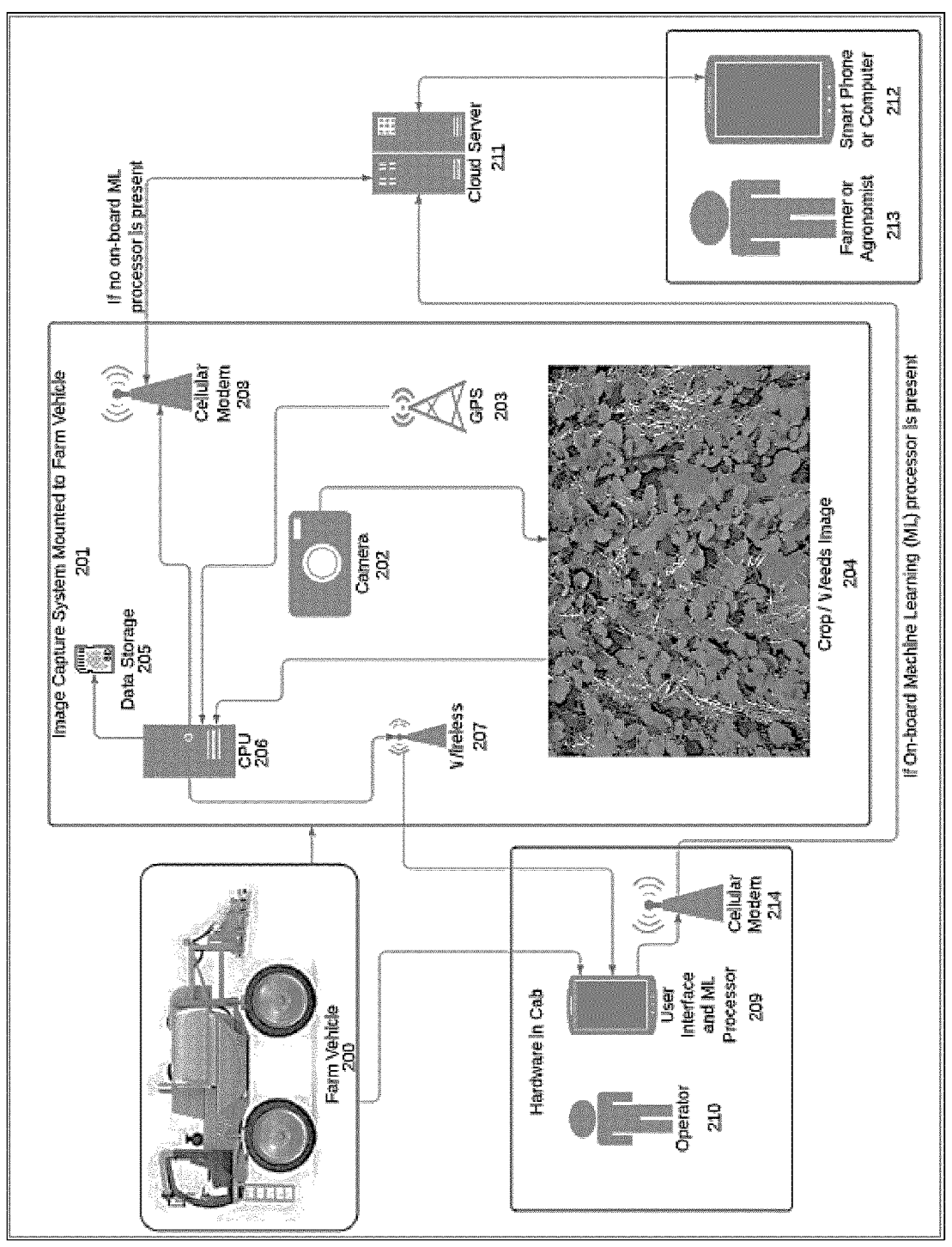
FIG. 1 is a block diagram illustrating the system hardware layout and connections between the hardware components.

Larger farm sizes may increase difficulty for farm managers and agronomists to visit all management zones of a field at critical times throughout the growing season. Some suggest using drones for capturing images of the management zones; however, drone operation requires planning and monitoring of the flights by an operator as automated flying drones may present a liability risk to the farmer. Some suggest satellite imagery but currently a resolution may be insufficient for plant level analysis and cloud cover may obscure a view of management zones at critical growth stages.

Farmers travel over the fields with a wide variety of agricultural vehicles, most often a sprayer 200 during a growing season. This vehicle 200 may provide an economical platform for a camera system 201 to automatically capture high resolution images of a crop every time this vehicle 200 travels across a field. Vehicles 200 such as sprayers may be travelling across each field one to five times throughout the growing season. By providing a kit to be easily applied to the vehicle 200, the image capture system 201 may autonomously collect and/or analyze field data and/or provide a web interface executing on a cab processor 209 through a local Wi-Fi network 207 to monitor an operation of the image capture system 201. The web interface may provide display of a status of the camera system 201, such as a live color coded coverage map of each crop and/or weed detected by the ML processes as described herein; a temporary image preview; and/or alerts for possible blurry images based on a minimum file size threshold.

The camera system 201 as described herein may automatically provide high-resolution images and analysis of those images to farm managers and agronomists every time a farm vehicle 200 passes over the fields. Farm managers are spending less time in farm vehicles such as sprayers 200 travelling over fields so in-field observations may be less frequent. Eventual autonomy of farm vehicles may result in human eyes seeing less areas of fields across farms. The image capture system 201 may be easily mounted on autonomous farm vehicles 200 to automatically capture and upload images at the plant level to farm managers, agronomists, and/or machine learning (ML) processes.

An automated low cost crop image collection and analysis system at a plant level resolution is provided herein. Various agricultural vehicles 200, especially a sprayer, may serve as an economical mobile platform for the image capture system 201 that covers many fields per day multiple times per year. The sprayer 200 may cover a 5,000 acre farm over a ten day period during a prime weed spraying window. One or more machine learning (ML) processes executing on one or more processors 206, 211, 209 may be applied to one or more images resulting in a record of crop and/or weed growth trends by each SWAT management zone. The ML processes may generate a coefficient of variation and assign a variability rating of very low, low, typical, high, very high based on the coefficient of variation. This zone-based feedback records may be used to create one or more variable rate prescriptions, one or more evaluations of implemented management strategies, and/or aid in planning and/or development of future management strategies. The ML processes 111, 115 may distinguish between crop and weeds and calculate densities and other factors for each SWAT management zone. The ML processes 111, 115 may determine bare soil coverage, soil organic matter (using soil colour), soil texture (using soil roughness), plant spacing, and/or plant density (e.g. plant counts/area).

As described with reference to FIG. 1, a method and system for capturing and/or extracting data from the images of field crops at the plant level at predetermined locations and/or fixed interval locations representing some or all of the management zones of the field is described. The management zones may be based on soil, water, and/or topography (SWAT) features. The images may be captured using one or more cameras 202 and provided to an on-board processor 206. Once the images are captured, image data may be automatically uploaded via cellular data transfer 208 to a field specific folder on a cloud server 211 by the processor 206 and/or processed on an on-board ML processor 206. These images may be received and viewed by farmers and agronomists 210 on a user interface executing on the cab processor 209 for observation and/or comparison across management zones within a desktop or mobile software platform.

The ML processes 111, 115 may be applied either using the on-board ML processor 206 and/or at the cloud server 211 such that important data of the crop and/or weeds for each management zone may be quantified and/or reported. One or more high-resolution weed and/or crop density maps may also be created by programming the camera system 202 to capture images at high density within the management zone. In some aspects, the capture of images at the high density may provide high-resolution maps for at least one of: soil organic matter, soil texture, bare soil, plant spacing, and/or plant counts. The high-resolution maps may be generated by capturing image data every approximately 40-feet to approximately 80-feet in a grid-based pattern. The ML processes 111, 115 may be trained over time to provide more accurate differentiation between weeds and crops and/or soils as more images and ground data provided by agronomist may be provided to the ML processes 111, 115.

Data extracted from one or more crop images by the ML processes 111, 115 described herein may provide a report card on crop emergence and/or progress throughout the growing season. The ML processes 111, 115 may also extract data from the images that may indicate disease, insect, and/or environmental damage based on leaf discoloration and/or deformity. Seeding equipment malfunctions may also be identified.

The ML processes 111, 115 as described below may determine plant stand counts and/or crop staging checks in order to assess variable rate seed and/or fertility strategies. One or more objectives of a variable rate seed program may be to achieve a recommended plant stand count and/or similar crop staging at fungicide and/or harvest timings across most or all of the management zones. The cameras 202 and/or the ML processes 111, 115 executing on the ML processor 206 may enable increased accuracy and/or frequency in measuring the plant stand count and/or staging. Current plant stand count and crop staging checks are laborious and too low of resolution to capture accurate representation of all management zones. Significant labor investment to conduct manual plant stand counts and/or crop staging checks for all fields on the farm makes comprehensive evaluations cost prohibitive. Common practice is to sample one field for each crop type on the farm. As well an optimal timeframe to conduct crop plant stand counts and crop staging checks may be typically condensed within an approximate three week period and the management zones may be spread across a large geographic area which stresses available labor resources. The techniques described herein may alleviate these labor problems while permitting a comprehensive measurement of each management zone by automatically capturing the plant stand count and/or crop staging for each management zone and providing these measurements to farmers and agronomists via the user interface executing on the cab processor 209. The measurement of each management zone may further enable optimization of in-field crop plant stand count and/or staging checks to be targeted at new farms and/or problem management zones for more effective labor utilization.

Soil, water, and/or topography features of a field or management zone may be dominant influences on a location, a density, and/or a type of weeds found in the field. As described herein, the images for the management zones may provide a history of one or more weed locations and/or may provide a weed density from the ML processes 111, 115. This weed history may be used for developing a variable rate herbicide and/or a soil applied weed control product application for the management zone and/or multiple management zones across the farm.

A history of a crop establishment by management zone may also be compiled from the ML process data outputs. Trends may be established on how individual crops establish better or worse in each management zone. A correlation of the historical establishment data to the SWAT soil test data for each management zone may be made to explain why the crop establishment is meeting or not meeting targeted plant population in the management zone. The SWAT soil test data may include one or more salinity levels, one or more organic matter levels, one or more soil textures, one or more pH measurements, one or more soil moisture measurements, one or more landscape positions, one or more water regimes, one or more background nutrient levels, and/or one or more applied nutrient levels. This crop establishment history may be used for fine tuning a variable rate seed strategy, a fertilizer strategy, and/or a herbicide strategy for this same management zone and/or other management zones with similar SWAT characteristics.

The method herein may include capturing plant level images of the crop and/or weeds at predetermined locations and/or at fixed distance intervals within multiple management zones within the field at early growth stages. The ML processes 111, 115 may extract attributes such as a crop leaf area, a weed leaf area, a soil colour (to estimate soil organic matter), a soil roughness (to estimate soil texture), a plant spacing, and/or a plant count per area from each image. The plant spacing and/or the plant counts per area may be used to evaluate a performance of seeding equipment and/or variable seed rate strategies. The plant spacing and/or the plant counts per area may also be used to calculate seed mortality by comparing these extracted attributes to applied seed rate data provided from a seeding equipment controller. One or more maps of the extracted attributes, such as crop leaf area and/or the weed leaf area, may be generated within GIS software. The maps may direct scouting efforts and/or create variable rate herbicide prescriptions. The weed leaf area and/or the crop leaf area may be summarized by the management zones characterized by the SWAT properties of management zones. Crop management strategies may be adjusted by considering a correlation of crop emergence and/or weed populations to the soil and water properties.

Figure 2:
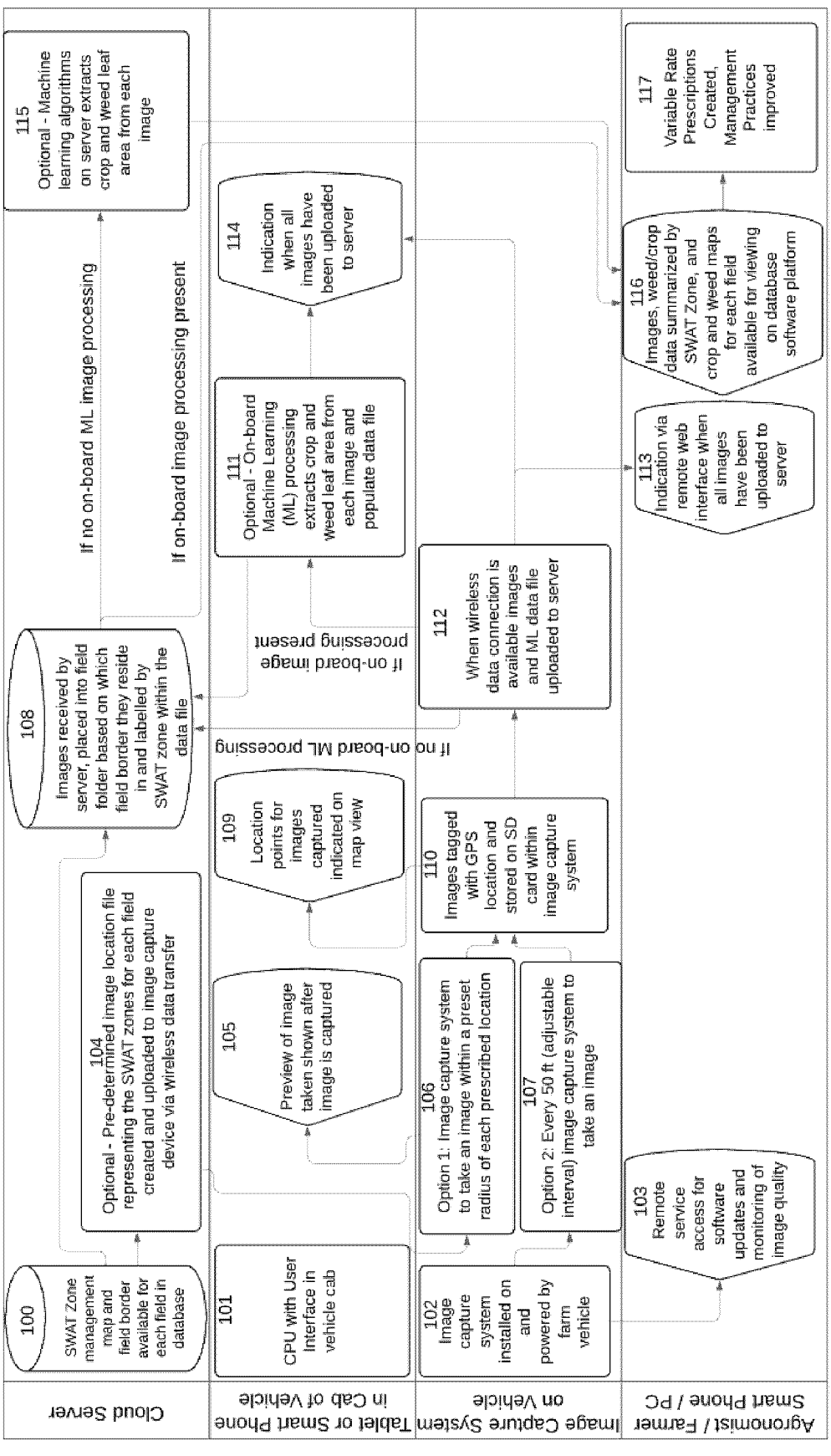
FIG. 2 is a flowchart illustrating the high level process workflow.

Turning to FIGS. 1 and 2, the image capture system 201 may be mounted to an exterior of the vehicle 200 and the image capture system 201 may be powered by the vehicle 200 via a power cable at step 102. The image camera system 201 may comprise a computer system 206 with a processor executing one or more instructions from a tangible computer-readable medium. The computer system 206 may provide instructions to a camera 202 to capture one or more crop/weed images 204. The crop/weed images 204 may be stored in a data storage 205, such as an SD card or other similar storage device. The computer system 206 may receive one or more GPS coordinates (e.g. locations) from a GPS sensor 203. The computer system 206 may communicate via a communication channel, such as a cellular modem 208 to a cloud server 211 located remotely from the farm vehicle 200. Although not explicitly shown, the cloud server 211 may be coupled to appropriate networking hardware to permit communication with the cellular modem 208. The cloud server 211 may also communicate with a farmer and/or agronomist 213 via a smartphone (or an agronomist computer) 212.

The computer system 206 may communicate wirelessly using the communication channel, such as a local Wi-Fi access point 207 with one or more devices within a typical Wi-Fi range of the farm vehicle 200. In this aspect, the computer system 206 may communicate with a user interface executing on a processor 209 within the cab of the farm vehicle 200. The processor 209 may also have a cellular modem 214 for communication directly to the cloud server 211.

In this aspect, the camera 202 may capture standard red-green-blue (RGB) images. In other aspects, the camera 202 may capture other spectrums such as NIR (Near Infrared), IR (Infrared), and/or future image formats. The camera 202 may be located 3 to 6 ft off a ground surface at step 102.

An angle of the camera 202 may be manually adjustable. In some aspects, more than one camera 202 may be mounted to wide vehicles 200 and providing captured images to the computer system 206. The image capture system 201 may comprise a gyroscopic sensor (not shown) such that images may be selectively captured when the vehicle 200 is in the fields and that the vehicle 200 is in an operating configuration.

Likewise, the user interface and/or cab processor 209 may be installed within the cab of the vehicle at step 101.

Once the image capture system 201 is initialized, the computer system 206 may provide a remote service access via the cellular modem 208 to the agronomist computer 212 at step 103. The remote service access may provide the agronomist computer 212 with an interface for the agronomist 213 to monitor image quality and/or location. The agronomist computer 212 or the cloud server 211 may provide one or more software updates to the computer system 206.

One or more zone maps 100, such as a SWAT MAP produced by SWAT Maps software of Croptimistic Technology Inc., for each field may guide an image location assignment. The SWAT Maps software may execute on the agronomist computer 212. The image location assignment may involve assignment of one or more locations for the crop images 204 to be captured in each field. A number of images per management zone and/or the management zones to capture images may be selectable within a GIS (Geographic Information System) software system such as SWAT Records, also produced by SWAT Maps software produced by Croptimistic Technology Inc. The SWAT Records software may also be executing on the agronomist computer 212. At step 104, the GIS software may automatically populate one or more GPS (Global Positioning System) locations and/or save the locations within a GIS file type, such as a shp file. The GIS file may be provided to the image camera system 201 such that when the GPS location retrieved from the GPS 203 reaches the locations within the GIS file, the computer system 206 instructs the camera 202 to take an image.

Figure 5:
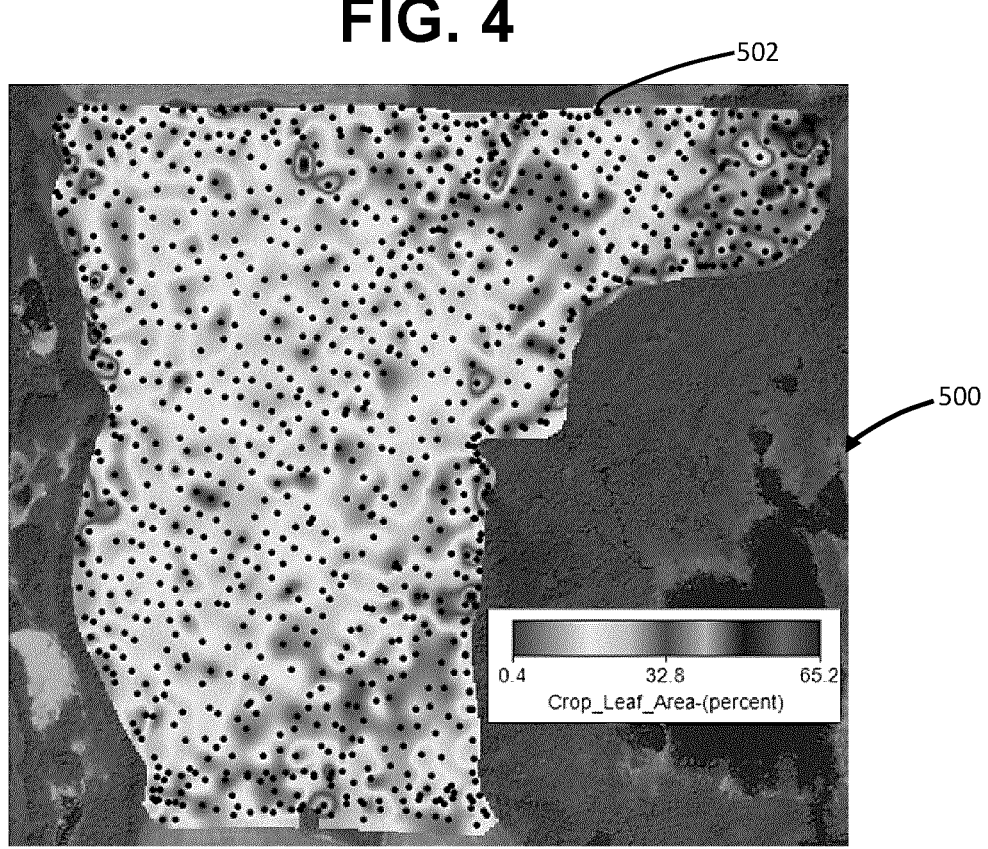
FIG. 5 is a crop leaf area percentage map showing image location points used to derive the map.

As shown particularly in FIG. 5, the GPS locations 502 (shown by each dot in the map 500) may be selected so that the image captures may be spread as evenly as possible within the selected management zones. In some aspects, the agronomist computer 212 may provide a user interface to the agronomist 213 for adjusting the GPS locations 502 if the agronomist 213 determines the GPS locations 502 would not produce useful image data. The computer system 206 may receive one or more GPS coordinates from the GPS sensor 203. When the GPS coordinates is within a pre-set radius from one or the GPS locations 502, then the computer system 206 may instruct the camera 202 to capture an image at step 106.

Since the vehicle 200 travels across fields in wide passes and the operator 210 may not purposely drive nearer to the GPS locations, the pre-set radius may be adjustable. The radius may be set either within the GIS file type and/or within a configuration tab of the user interface executing on the cab processor 209 to approximately 60% of a pass width of the vehicle 200 to ensure images may be captured in all or most of the GPS locations.

In some aspects, the computer system 206 may determine when one or more of the captured images is below a predetermined file size and may discard the captured image(s). A low file size may be associated with a blurry image which the ML process 111, 115 may be unlikely to extract accurate data. An alert may be sent to the farm manager computer and/or agronomist computer 212 when a number of images are determined by the computer system 206 having a small file size. The alert may suggest cleaning a camera lens cover to ensure sufficient quality images.

The captured images may then be stored in the data storage 205 along with the GPS coordinate for each image at step 110. Once the computer system 206 detects a wireless connection via the local Wi-Fi access point 207 to the cloud server 211, the captured images stored on the data storage 205 may be transferred to the cloud server 211. In other aspects, the computer system 206 may transfer the captured images via the cellular modem 208 to the cloud server 211. In some aspects, the computer system 206 may transfer a selectable percentage of the captured images in order to reduce a total file size being uploaded via the cellular modem 208.

If no cellular service is detected by the computer system 206, such as in a remote area, the captured images may be stored locally on the data storage 205 in the CPU 206 and/or on-board cab processor 209 and may be automatically uploaded to the cloud server 211 by the computer system 206 when the cellular connection is detected by the cellular modem 208 at step 112. The number of images stored locally and yet to be uploaded to the cloud server 211 may be indicated within the user interface executing on the cab processor 209.

The cloud server 211 may execute instructions upon receiving the captured images and store a small percentage of the captured images (e.g. 10-50 example images per field) as described in further detail below and/or associated image data for each field into the appropriate field folders within the GIS software package at step 108. In some aspects, the uploaded images may be automatically stored in a particular folder based on the associated GPS coordinate for the uploaded image. Any of the uploaded images that lie outside of a field border may be automatically discarded. The image data may be automatically aggregated and/or presented to the farmer and/or agronomists within the GIS software package such as SWAT Records at step 116.

In some aspects, the GPS locations 502 may be determined by a distance travelled at step 107. The step 107 may be particularly suitable when high resolution crop image data is desired, such as capturing image data every 40-feet to 80-feet in the grid pattern across the field or management zone. For example, the computer system 206 may receive GPS coordinates and once the farm vehicle 200 has travelled a distance of approximately 50-ft (adjustable distance), the computer system 206 may instruct the camera 202 to capture an image. The distance at which the images may be captured may be determined using an adjustable speed range such that no images may be captured at higher speeds where the image quality may be insufficient. A quality of an image sensor in the camera 202 and/or lighting conditions may determine a maximum suitable speed of the farm vehicle 200. In some cases, the image quality may degrade once speeds exceed 35-km/h. High quality images may be captured during typical travel speeds of about 10-km/h to about 30-km/h. As previously mentioned, the images may be stored locally on the data storage 205 and may be tagged with the GPS coordinates at step 110, then later downloaded via the local Wi-Fi access point 207 for post processing or uploaded via cellular data transfer 208.

The GPS coordinates for each of the captured images may be transferred from the computer system 206 to the user interface executing on the cab processor 209 at step 109. These GPS coordinates may be displayed on an onscreen map of the user interface 209. For each captured image, a preview of the captured images may be transferred from the computer system 206 to the user interface executing on the cab processor 209 at step 105. In some aspects, a previous image captures may be displayed on the user interface executing on the cab processor 209. In some aspects, the operator 210 may select one of the GPS coordinates on the onscreen map of the user interface 209 and the image associated with the selected GPS coordinate may be displayed on the user interface executing on the cab processor 209.

The user interface executing on the cab processor 209 may alert the operator 210 in the case of the image capture system 201 not operating properly, such as the camera 202 capturing blurry images. Occasional cleaning of a lens of the camera 202 may be required by the operator 210 of the vehicle 200. In some aspects, the camera 202 may be outfitted with an automated lens wiper.

The captured images may be processed through one or more machine learning (ML) process executing on the cloud server 211. Other aspects may have all or portions of the ML process 111, 115 executing on the computer system 206, the cab processor 209, the cloud server 211, and/or the agronomist computer 212. In some aspects, the captured images may be pre-processed prior to being processed by the ML process 111, 115. The pre-processing steps may involve an image resize to match input dimensions of the ML process 111, 115 and/or normalization of intensity values.

In one aspect, the ML process at step 115 executing on the cloud server 211 may process the captured images to extract crop and/or weed data from each captured images and/or aggregate the captured images by management zone, field, and/or crop across a farm. The crop and/or weed data may comprise one or more of: a percent crop leaf area, a percentage weed leaf area, a crop height, a plant population, a crop leaf color, a crop leaf discoloration due to disease, a crop damage due to insects or environmental conditions, plant spacing, plant count/area, soil organic matter, soil textures, and/or a crop and/or a soil temperature. An example of a crop leaf area map produced using the ML process 115 may be shown in FIG. 5 within the GIS software.

In another aspect, the ML process at step 111 executing on the cab processor 209 may process the captured images to extract crop and/or weed data from each captured images and/or populate a data file. The data file may then be subsequently provided to the cloud server 211 via the cellular model 214. In addition to the data file, a portion of the captured images may be included in the transfer to the cloud server 211, such as captured images of a best quality (e.g. largest file sizes) that may represent a range of leaf area data found in the management zone. For example, if the range of the crop leaf area for the management zone was determined by the ML process 115 to be in the range of 0% to 10%, then one or more of the largest file size images with a leaf area in the range of 0% to 10% may be selected for uploading to the cloud server 211.

A variety of ML processes 111, 115 may be applied to extract data from the images. One such process that may be employed is semantic segmentation at the image pixel level. The process involves manual labelling of weed pixels in a number of images for the purposes of training the model as to what is a weed and what is crop.

Figure 6:
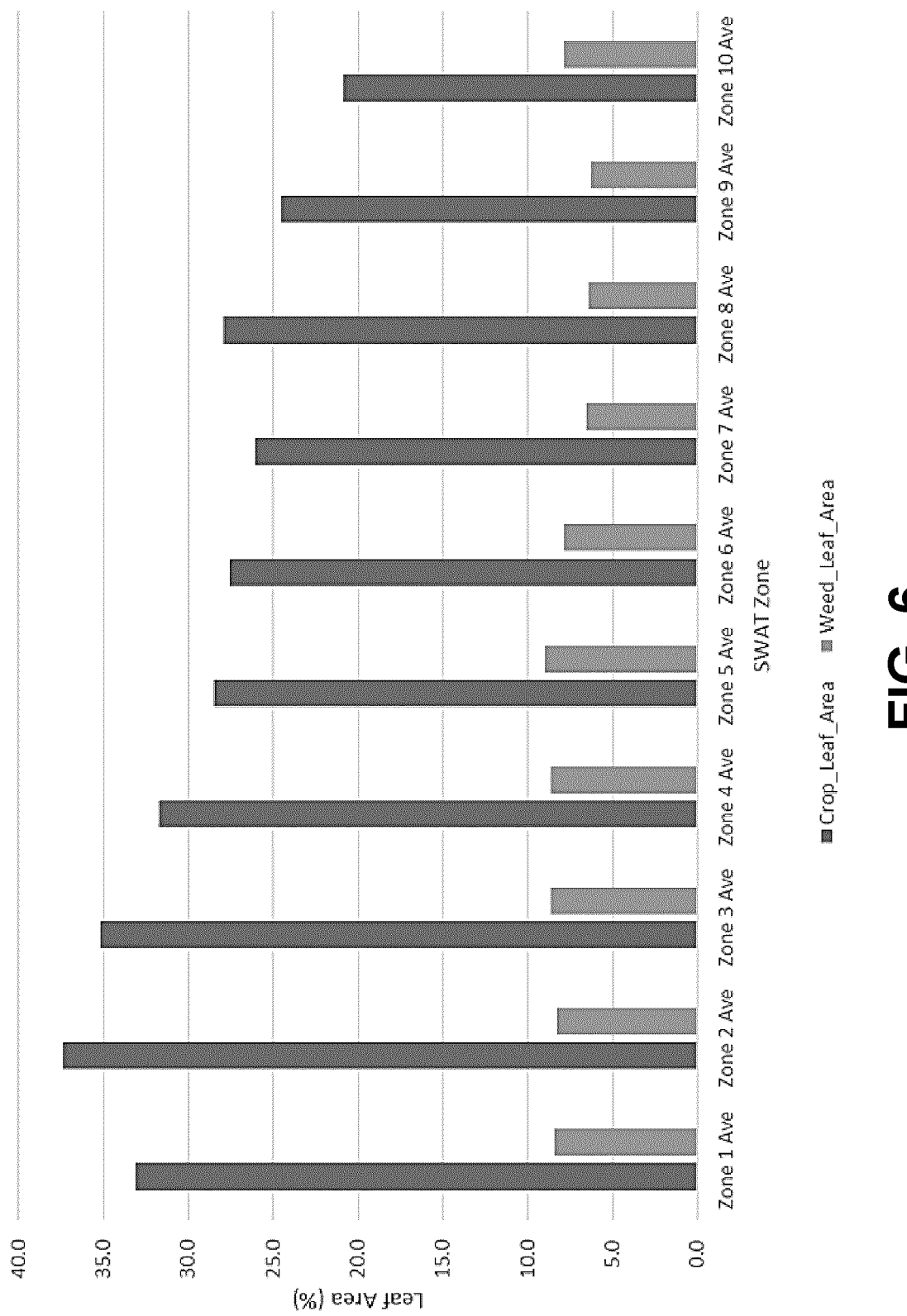
FIG. 6 is a graph of weed and crop leaf area summarized by SWAT management zone.
Figure 7A:
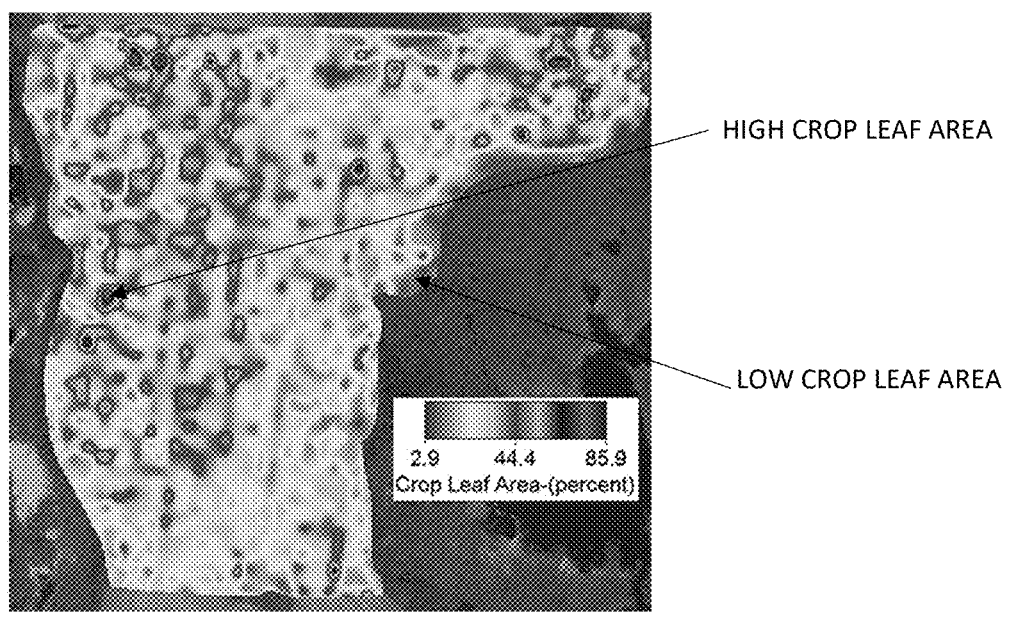
FIG. 7A is a map of crop leaf area and FIG. 7B is a map of weed leaf area.
Figure 7B:
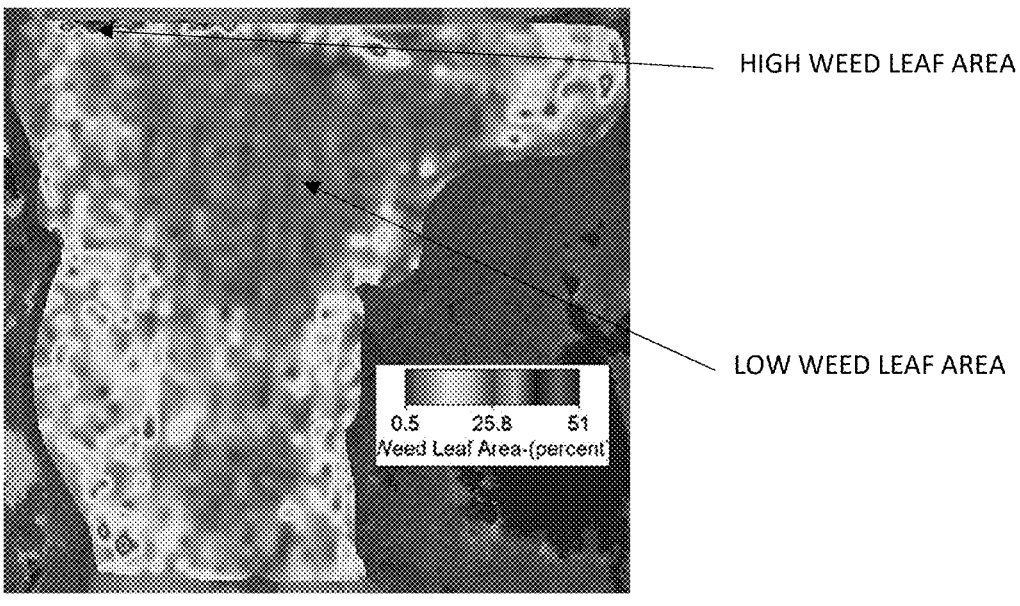

The cloud server 211 may generate a report from the ML process. The report may comprise image data by zone, field, soil type, and/or crop as shown in FIG. 6. The ML process may also generate weed data and/or crop data to be used by the GIS software package in order to produce one or more weed maps and/or crop maps such as shown in FIGS. 7A and 7B. The individual images may also be viewed within the GIS software package on any smart phone 212 or desktop computer at a later date by farmers and/or agronomists 213 in order to subjectively evaluate crop establishment and/or performance as part of step 116 previously described. The agronomists and/or farmers 213 may provide feedback by identifying management zones where the estimates from the ML process 111, 115 were unsatisfactory. The images from these management zones along with the feedback may be used to retrain the ML processes 111, 115.

Figure 3:
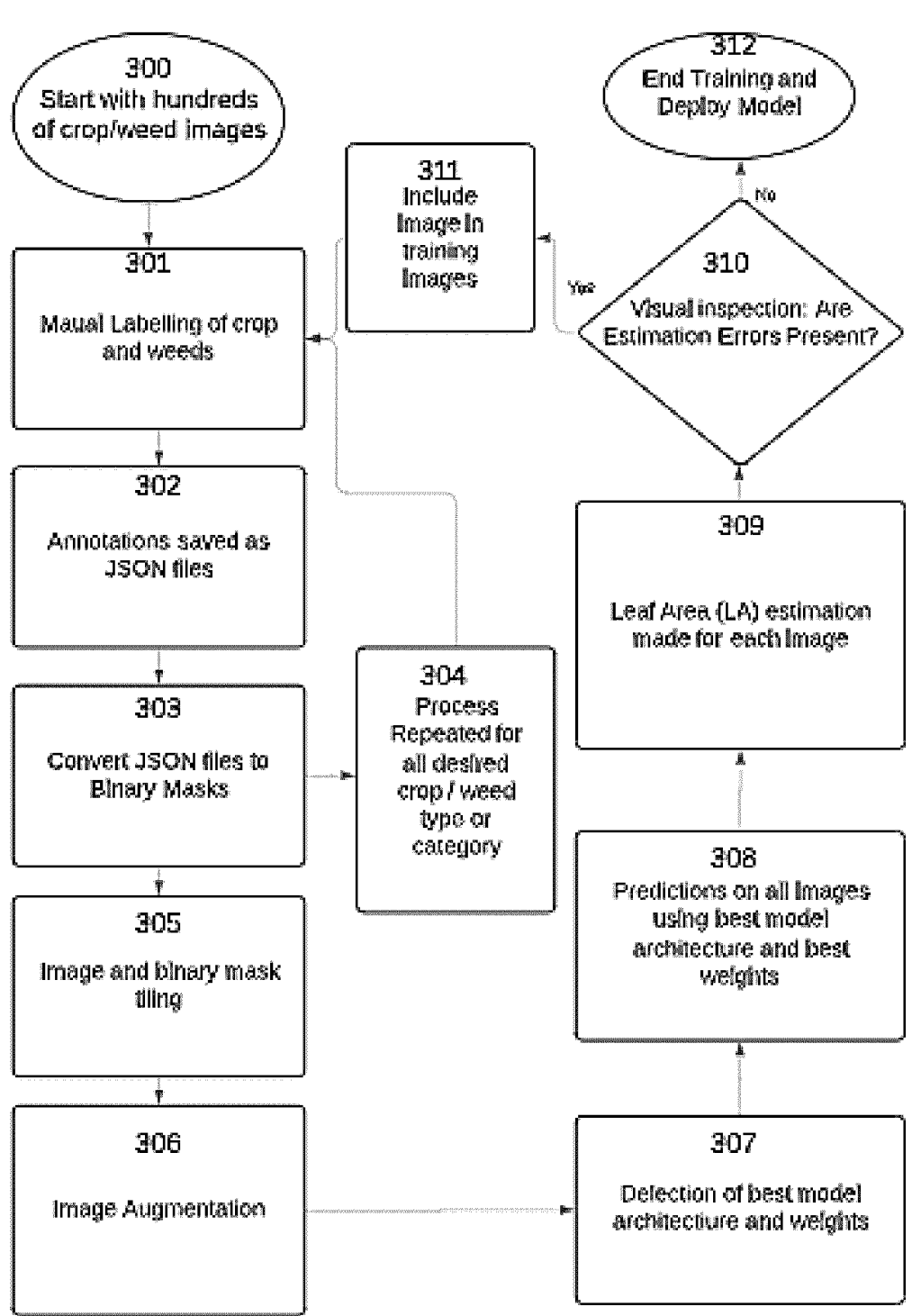
FIG. 3 is a flowchart illustrating the Machine Learning (ML) workflow.
Figure 4:
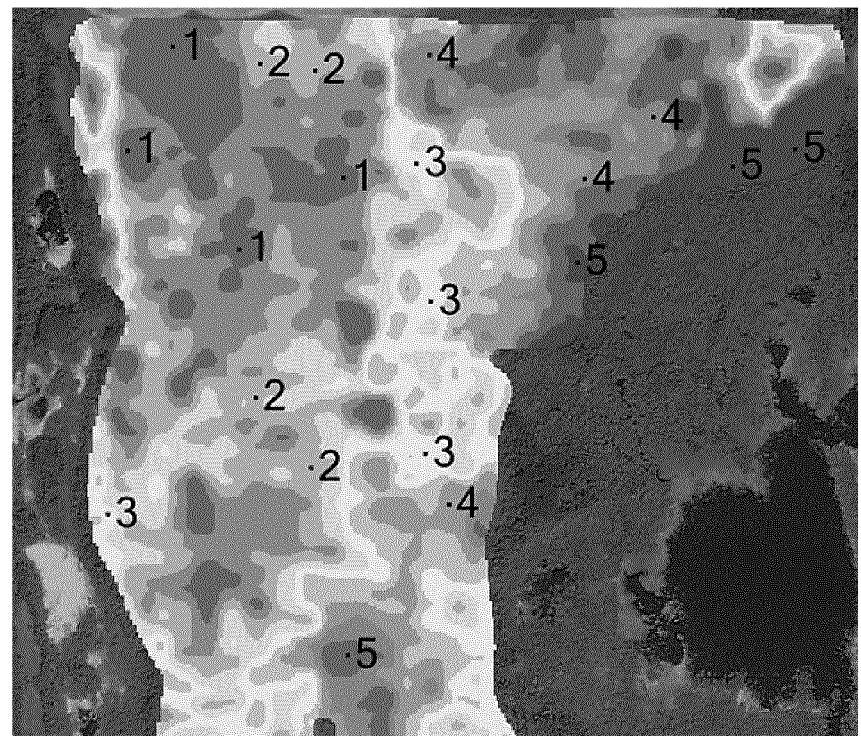
FIG. 4 is a management zone map with desired image location points representing each zone.

A ML model training process for the ML process 111, 115 as described with reference to FIG. 3 may start at step 300 with an initial training set of approximately 100 to 500 training images of crop and/or weeds in agricultural fields. For each of the training images, one or more weed polygons and/or crop polygons may be drawn around identified weeds within each of the training images at step 301. These weed polygons and/or crop polygons may be saved in a Java Script Object Notation (JSON) formatted file at step 302. The JSON files may be converted to one or more binary masks corresponding to the weed polygons and/or the crop polygons at step 303. Steps 301 to 303 may be repeated for every weed type and/or crop type at step 304.

The binary masks may be tiled at step 305 into 4 to 25 tiles depending on an image height and/or an image width, such as 4032×3024 resolution. In some aspects, the binary masks may be tiled into 4 tiles for training of the ML process 111, 115. Once trained, the ML process 111, 115 may receive lower resolution images, such as those with the image height and/or width of 1440×1080. The binary masks may be augmented at step 306 by performing a rotating operation, a flipping operation, and/or a cropping operation in order to properly orient the binary mask of the plant.

An example training process may train the ML process 111, 115 to determine a weed density. One or more color coded maps may be generated by the GIS software retrieving previously acquired measurement data of the weed density. The color coded maps may use one or more of the individual measurement points from the measurement data measured at approximately 40-ft to approximately 80-ft resolution across the management zone. The GIS software may interpolate the weed density between the individual measurement points to improve a resolution of the color coded maps. The high resolution maps may be approximately 6-ft by approximately 6-ft for each pixel of the map. The color coded maps may then be provided to the ML process 111, 115 along with captured images across the management zone in order to train the ML process 111, 115. A low leaf area may be assumed to have a low weed density and a high leaf area may be assumed to have a high weed density.

Figure 8A:
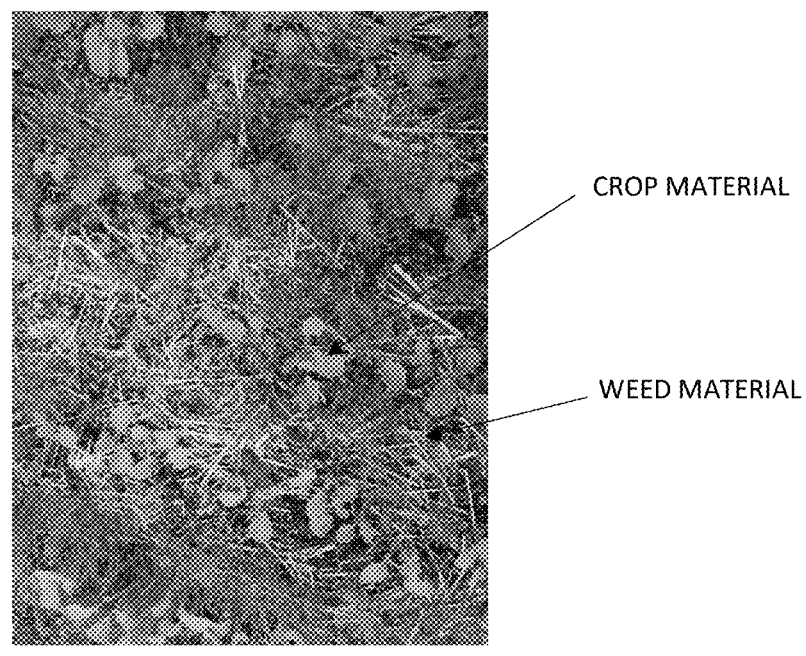
FIG. 8A is an example of a captured image of crop and weeds and FIG. 8B is a corresponding weed heat map highlighting what is crop material and what is weed material.
Figure 8B:
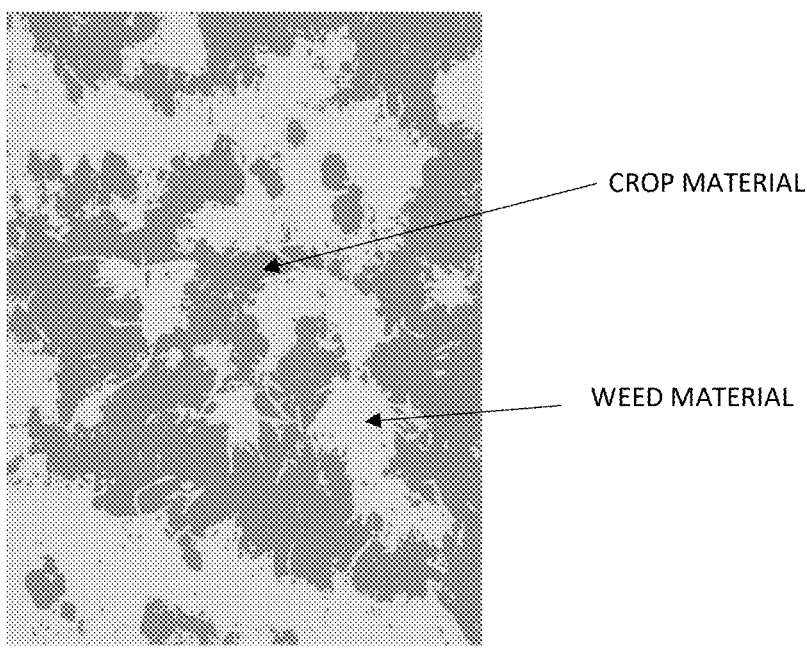

A detection process 307 may select an appropriate model architecture and/or weights for a convolutional neural network (CNN). The selection of the model architecture and/or weights for the CNN may be based on a highest accuracy and/or mean intersection over union (MIOU) metrics. In this aspect, the CNN may be a Resnet 50 based SegNet and/or U-Net architectures particularly adapted for semantic segmentation. A prediction may be made at step 308 on all or most of the captured images using the appropriate model architecture and/or weights in order to produce a heat map for each weed and/or crop. An example of input captured images and associated heat map are shown respectively in FIGS. 8A and 8B. The heat map may be saved as a .png format file.

The heat map may be used by a leaf area estimation process 309 that may automatically count pixels that are associated with weeds and/or crops within the heat map. The leaf area estimation process 309 may populate a .CSV formatted file with the leaf area estimates along with the image filename and/or GPS positions of each image. A visual comparison at step 310 of the captured images and the heat maps may be used to identify leaf area estimation errors. Typically a small percentage of the captured images representing a full range of leaf area estimations for the data set may be selected for further investigation. For example, if the range of leaf area in the images is 0-10%, then images that may have current estimates of 0, 2, 4, 6, 8, 10% may be selected for further visual comparison of the actual image to the image heat map to identify a severity of the estimation errors. If significant errors are found, then the data set may be tagged as a retraining data set for a subsequent training process.

Any images determined to have estimation errors may be added to the training set at step 311 in order to correct training errors by fine-tuning one or more weights. Once ML training process shown in FIG. 3 is complete, the trained model may be deployed at step 312 by saving a deployment model and/or associated weights to a tangible computer-readable medium for execution by the cloud server 211 and/or the cab computer 209. In some aspects, the captured images may be down-sampled to the lower image resolution. Through lowering the resolution, a processing time of the deployment model may be reduced to balance a speed and a performance of the deployment model to produce a prediction. Once the prediction is made through the deployment model, parameters like weed leaf area index, crop leaf area, crop density, plant spacing, bare soil coverage, soil organic matter, soil texture, and/or crop stand count may be estimated using one or more morphological image processing operations. These parameters may be populated in one or more comma-separated variable (CSV) files according to geographic location retrieved from one or more embedded geographic coordinates within the captured images. The parameters may then be mapped by reading the CSV files and plotting one or more selected parameters.

The cab processor 209 may be selected to have a processing power to execute the trained ML process 111, 115 and associated pre-processing steps so that the captured images may be processed at a rate that maintains or exceeds pace with a speed of the image capture. As previously mentioned, the farm vehicle 200 may typically travel between 10-km/h and 30-km/h. Using the top typical speed of 30-km/h (e.g. 27-ft/s) and an image capture distance of approximately 50-ft, each image captured may be processed in less than about 1.9-sec.

The above detailed description of the aspects of the invention is not intended to be exhaustive or to limit the invention to the precise form disclosed above or to the particular field of usage mentioned in this disclosure. While specific aspects of, and examples for, the invention are described above for illustrative purposes, various equivalent modifications are possible within the scope of the invention, as those skilled in the relevant art will recognize upon reviewing the present description and drawings. Also, the teachings of the invention provided herein can be applied to other systems, not necessarily the system described above. The elements and acts of the various aspects described above can be combined to provide further embodiments.

All of the above patents and applications and other references, including any that may be listed in accompanying filing papers, are explicitly incorporated herein by reference. Aspects of the invention can be modified, if necessary, to employ the systems, functions, and concepts of the various references described above to provide yet further embodiments of the invention.

Changes can be made to the invention in light of the above "Detailed Description" while the above description details certain aspects of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. An image capture system configured to be mounted to a farm vehicle, the image capture system comprising:
    at least one camera;
    a global positioning sensor (GPS);
    a data storage;
    a communication channel;
    a processor executing instructions from a tangible computer-readable medium, the instructions comprise:
        receiving at least one image capture location via the communication channel;
        receiving at least one GPS coordinate from the GPS;
        determining when the at least one GPS coordinate is within a predetermined radius of the at least one image capture location;
        instructing the at least one camera to capture at least one image of field crops;
        receiving the at least one image corresponding to the at least one image capture location; and
        storing the at least one image on the data storage;
    wherein the at least one image of field crops is processed by at least one machine learning process to extract at least one of: plant spacing data and plant counts per area data.

2. The image capture system according to claim 1, wherein the instructions further comprise: providing the at least one image of field crops to a cloud server via the communication channel.

3. The image capture system according to claim 2, wherein the cloud server comprises at least one machine learning process processes the at least one image of field crops.

4. The image capture system according to claim 1, wherein the at least one machine learning process further extracts at least one of: crop data, weed data, percentage of bare soil, soil organic matter data, soil texture data, and vegetation coverage data from the at least one image of field crops.

5. The image capture system according to claim 1, wherein the at least one machine learning process aggregates the at least one image by at least one of: a management zone, a field, a crop type, a soil type, and a farm.

6. The image capture system according to claim 4, wherein the crop data and weed data comprise at least one of: a percent crop leaf area, a percentage weed leaf area, a crop height, a plant population, a crop leaf color, a crop leaf discoloration, a crop damage, a crop temperature, and a soil temperature.

7. The image capture system according to claim 4, wherein the at least one machine learning process generates a record of a crop growth trend and a weed growth trend for the management zone.

8. The image capture system according to claim 4, wherein the at least one machine learning process generates a coefficient of variation; and assigns a variability rating.

9. The image capture system according to claim 7 wherein the crop growth trend and the weed growth trend determine at least one variable rate prescription.

10. The image capture system according to claim 1, wherein the at least one camera is selected from at least one of: an RGB camera, a near infrared camera, and an infrared camera.

11. The image capture system according to claim 1, wherein the at least one camera is located on the farm vehicle between 3-ft to 6-ft above a ground surface.

12. The image capture system according to claim 1, further comprising a cab processor receiving an interface for displaying the at least one image.

13. An agronomist computer comprising: a communication channel; a processor executing instructions from a tangible computer-readable medium, the instructions comprise: generating at least one management zone; assigning at least one image location for each of the at least one management zone; populating at least one GPS location associated with the at least one image location; providing the at least one GPS location via the communication channel to the image capture system according to claim 1.

14. The agronomist computer according to claim 13, wherein the instructions further comprise: providing an interface to adjust the at least one image location for each of the at least one management zone.

15. The agronomist computer according to claim 13, wherein the at least one image location is evenly spaced throughout each of the at least one management zone.

\* \* \* \* \*